(12) United States Patent
Miyazaki

(10) Patent No.: US 8,605,341 B2
(45) Date of Patent: Dec. 10, 2013

(54) CONTROL DEVICE CONTROLLING SCAN OPERATION

(75) Inventor: Sadaaki Miyazaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 53 days.

(21) Appl. No.: 13/363,176

(22) Filed: Jan. 31, 2012

(65) Prior Publication Data

US 2012/0212788 A1 Aug. 23, 2012

(30) Foreign Application Priority Data

Feb. 23, 2011 (JP) .................................. 2011-036677

(51) Int. Cl.
*H04N 1/04* (2006.01)

(52) U.S. Cl.
USPC ............ 358/474; 358/475; 358/498; 358/448

(58) Field of Classification Search
USPC .......................... 358/474, 475, 467, 448, 498
See application file for complete search history.

(56) References Cited

U.S. PATENT DOCUMENTS

| 6,483,609 | B1 * | 11/2002 | Ueno et al. ..................... 358/434 |
|---|---|---|---|
| 2002/0167690 | A1 | 11/2002 | Fujii et al. |
| 2003/0048487 | A1 | 3/2003 | Johnston et al. |
| 2003/0218762 | A1 | 11/2003 | Edwards et al. |
| 2004/0001636 | A1 | 1/2004 | Miceli et al. |
| 2007/0070438 | A1 | 3/2007 | Yoshida et al. |
| 2007/0156705 | A1 | 7/2007 | Tsuya |
| 2008/0174836 | A1 | 7/2008 | Yoshihisa |
| 2009/0122336 | A1 | 5/2009 | Honma |
| 2010/0110500 | A1 | 5/2010 | Inoue |
| 2010/0165375 | A1 * | 7/2010 | Miyamoto et al. ........... 358/1.13 |

FOREIGN PATENT DOCUMENTS

| JP | H11-252328 A | 9/1999 |
|---|---|---|
| JP | 2004-104761 A | 4/2004 |
| JP | 2004-223828 A | 8/2004 |
| JP | 2006-172055 A | 6/2006 |
| JP | 2007-005940 A | 1/2007 |

(Continued)

OTHER PUBLICATIONS

European Patent Office, extended European Search Report for European Patent Application No. 12153113.1 (counterpart to above-captioned patent application), dated May 3, 2012.

(Continued)

*Primary Examiner* — Houshang Safaipour
(74) *Attorney, Agent, or Firm* — Baker Botts L.L.P.

(57) ABSTRACT

In a control device, the scan control unit controls a scanning operation in which data is to be generated by reading a document. The data format selecting unit selects one of a first format or a second format different from the first format as a data format in which the data is to be generated. The resolution setting unit sets a reading resolution based on the data format. The resolution setting unit sets a first resolution as the reading resolution when the data format selecting unit selects the first format whereas the resolution setting unit sets a second resolution different from the first resolution as the reading resolution when the data format selecting unit selects the second format. The scan control unit controls the scanning operation to read the document in the reading resolution set by the resolution setting unit.

10 Claims, 8 Drawing Sheets

(56) References Cited

FOREIGN PATENT DOCUMENTS

| | | |
|---|---|---|
| JP | 2007-174444 A | 7/2007 |
| JP | 2007-282125 A | 10/2007 |
| JP | 2008-034903 A | 2/2008 |
| JP | 2009-124316 A | 6/2009 |
| JP | 2010-108380 A | 5/2010 |
| JP | 4476203 B2 | 6/2010 |

OTHER PUBLICATIONS

Japan Patent Office, Office Action for Japanese Patent Application No. 2011-036677 (counterpart Japanese patent application), mailed Jan. 29, 2013.

European Patent Office, Office Action for European Patent Application No. 12153113.1 (counterpart European patent application), dated Mar. 21, 2013.

* cited by examiner

FIG. 4

| AVAILABILITY OF SCALING IN VERTICAL OR HORIZONTAL DIRECTION | JPG | TIFF | PDF | XPS |
|---|---|---|---|---|
| | UNAVAILABLE | UNAVAILABLE | AVAILABLE | AVAILABLE |

← → IMAGE FORMAT (JPG, TIFF)

← → DOCUMENT FORMAT (PDF, XPS)

| FORMAT | RESOLUTION SETTING | SCANNING RESOLUTION |
|---|---|---|
| JPEG TIFF | 150dpi | 150 × 150dpi |
| | 300dpi | 300 × 300dpi |
| | 600dpi | 600 × 600dpi |
| | 1200dpi | 1200 × 1200dpi |

5B

| FORMAT | RESOLUTION SETTING | SCANNING RESOLUTION |
|---|---|---|
| PDF(OCR) XPS(OCR) | 150dpi | 150 × 150dpi |
| | 300dpi | 300 × 300dpi |
| | 600dpi | 600 × 600dpi |
| | 1200dpi | 1200 × 1200dpi |

5C

| FORMAT | RESOLUTION SETTING | SCANNING RESOLUTION |
|---|---|---|
| PDF XPS | 150dpi | 150 × 150dpi |
| | 300dpi | 300 × 300dpi |
| | 600dpi | 600 × 600dpi |
| | | 1200 × 300dpi |
| | 1200dpi | 1200 × 1200dpi |

[SCANNING RESOLUTION: RESOLUTION IN MAIN SCANNING DIRECTION (dpi) × RESOLUTION IN SUB SCANNING DIRECTION (dpi)]

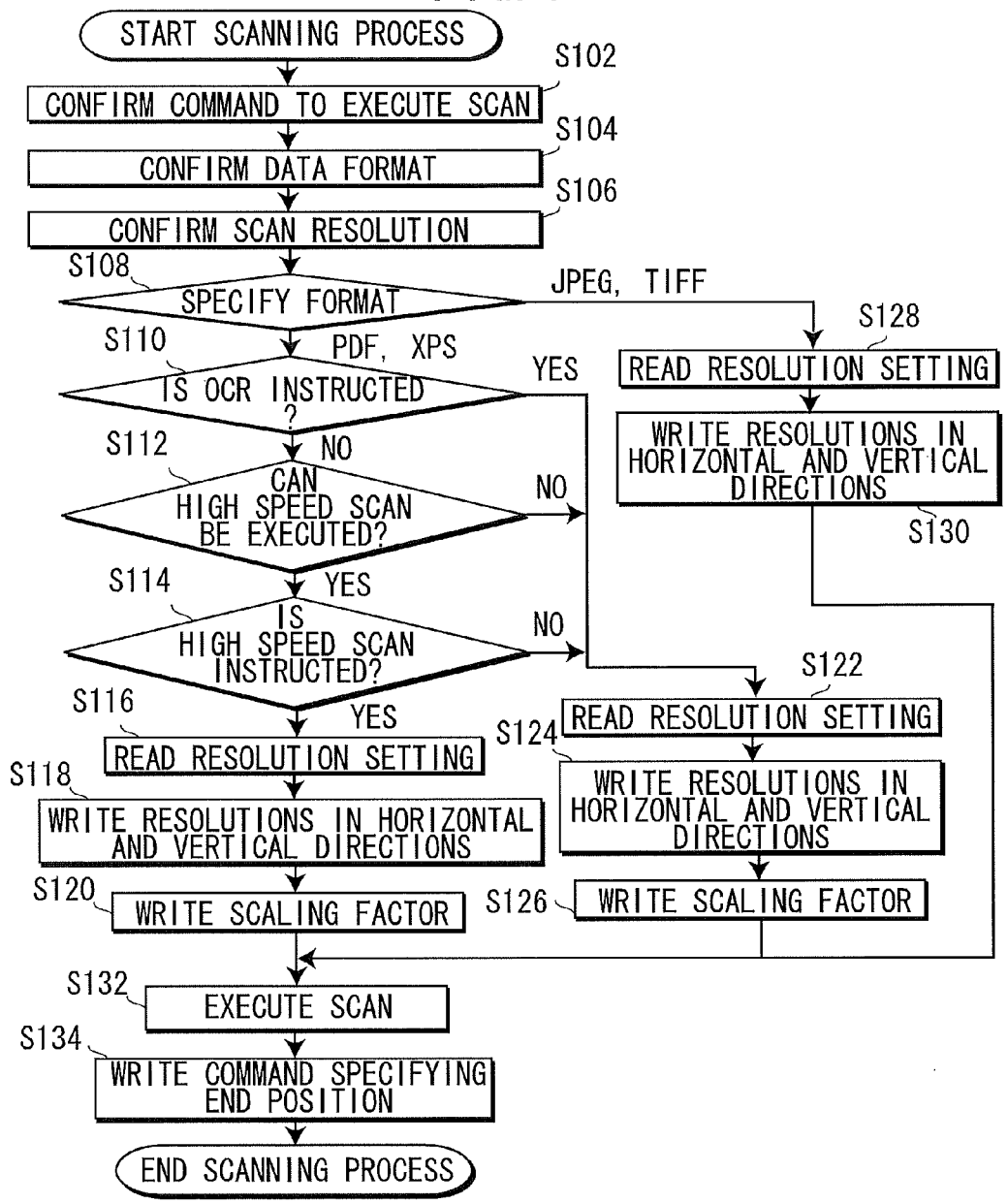

CONTROL DEVICE CONTROLLING SCAN OPERATION

CROSS REFERENCE TO RELATED APPLICATION

This application claims priority from Japanese Patent Application No. 2011-036677 filed Feb. 23, 2011. The entire content of the priority application is incorporated herein by reference.

TECHNICAL FIELD

The invention relates to a technology for controlling a scanning unit to scan an original document.

BACKGROUND

Scanning devices have conventionally executed scanning operations at a user-specified resolution, provided that the user has set the scanning resolution. Japanese Patent Application Publication No. 11-252328 discloses a device that executes scanning operations based on preset scanning resolutions, including a resolution for scanning an original to be printed on a printer (i.e., a copy operation) and a resolution for scanning a document when the scan data is to be posted to a Web site.

SUMMARY

However, in some cases the user has specified inappropriate resolution values for settings. To resolve this problem, it is an object of the invention to provide a technology for controlling a scanning unit to scan at a suitable resolution.

In order to attain the above and other objects, the invention provides a control device. The control device includes a processor functioning as a scan control unit, a data format selecting unit selecting, and a resolution setting unit. The scan control unit controls a scanning operation in which data is to be generated by reading a document. The data format selecting unit selects one of a first format or a second format different from the first format as a data format in which the data is to be generated. The resolution setting unit sets a reading resolution based on the data format. The resolution setting unit sets a first resolution as the reading resolution when the data format selecting unit selects the first format whereas the resolution setting unit sets a second resolution different from the first resolution as the reading resolution when the data format selecting unit selects the second format. The scan control unit controls the scanning operation to read the document in the reading resolution set by the resolution setting unit.

According to another aspect, the invention provides a non-transitory computer readable storage medium storing a set of program instructions for controlling a computer. The program instructions includes: (a) controlling a scanning operation in which data is to be generated by reading a document; (b) selecting one of a first format or a second format different from the first format as a data format in which the data is to be generated; and (c) setting a reading resolution based on the data format. The setting instruction (c) sets a first resolution as the reading resolution when the selecting instruction (b) selects the first format whereas the setting instruction (c) sets a second resolution different from the first resolution as the reading resolution when the selecting instruction (b) selects the second format. The controlling instruction (a) controls the scanning operation to read the document in the reading resolution set by the setting instruction (c).

According to another aspect, the invention provides a scanner system including a control device and a scanner performing a scanning operation in which a document is read to generate data. The control device includes a processor functioning as a data format selecting unit and a resolution setting unit. The data format selecting unit selects one of a first format or a second format different from the first format as a data format in which the data is to be generated. The resolution setting unit sets a reading resolution based on the data format. The resolution setting unit sets a first resolution as the reading resolution when the data format selecting unit selects the first format whereas the resolution setting unit sets a second resolution different form the first resolution as the reading resolution when the data format selecting unit selects the second format. The scanner performs the scanning operation to read the document in the reading resolution set by the resolution setting unit.

BRIEF DESCRIPTION OF THE DRAWINGS

In drawings:

FIG. 4 is an explanation diagram illustrating a difference between an image format and a document format;

FIG. 5 is tables illustrating correlations between resolution settings set by a user and scanning resolutions by which a scanning unit performs a scanning operation;

FIG. 6 is a flowchart illustrating a scanning process;

DETAILED DESCRIPTION

A. Embodiment

A-1. Structure of a Scanner

Figure 1:
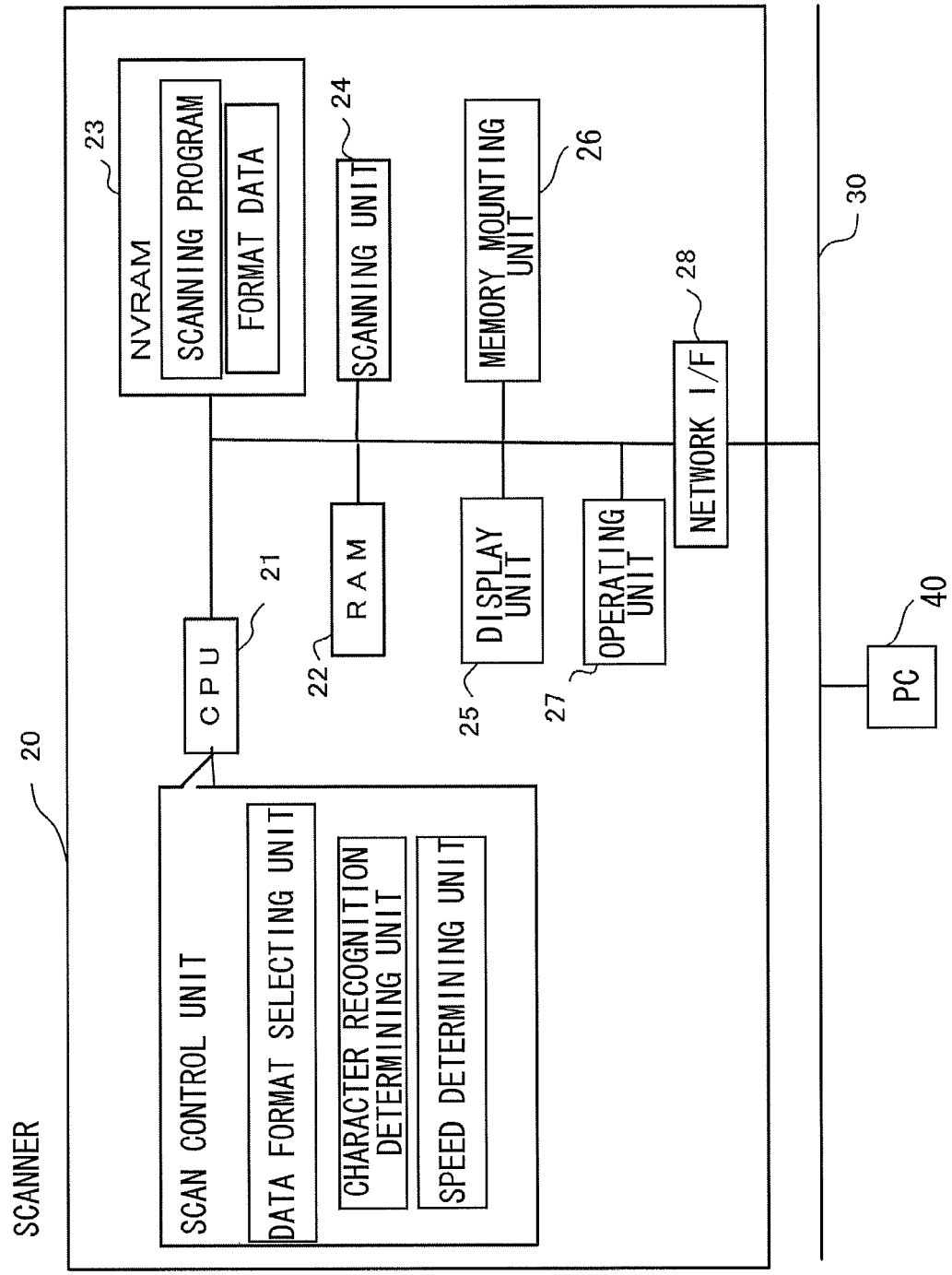
FIG. 1 is a block diagram illustrating a configuration of a scanner according to an embodiment.

FIG. 1 is a block diagram showing the general structure of a scanner 20 according to an embodiment of the invention.

The scanner 20 includes a CPU 21, a RAM 22, an NVRAM 23, a scanning unit 24, a display unit 25, a memory mounting unit 26, an operating unit 27, and a network interface 28, all of which components are interconnected via an internal bus.

The CPU 21 controls the operations of the scanner 20. In the embodiment, the NVRAM 23 stores format data related to a plurality of formats of data to be outputted, and a scanning program for controlling the scanner 20 in scanning an original. The CPU 21 reads the scanning program stored in the NVRAM 23 into the RAM 22 and executes the program, whereby the CPU 21 can control a scanning operation performed by the scanner 20.

The CPU 21 controls the scanning unit 24 to scans an original according to the scanning program and stores data obtained by the scanning operation in the RAM 22. The memory mounting unit 26 is a slot provided in the scanner 20 for inserting portable memory, such as USB memory. The user forces the CPU 21 to recognize the portable memory by inserting the portable memory into the memory mounting unit 26, whereby the user can transfer data stored in the RAM 22 to the portable memory. In the event that the scanner 20 is provided with a printing unit, the CPU 21 may be configured to generate a printing image based on data stored in the RAM 22 and to print out the image using the printing unit. The scanner 20 may also be connected to a local area network (LAN) 30 via the network interface 28 and may be configured to transfer data stored in the RAM 22 to another device on the network via the LAN 30. For example, the scanner 20 may connected to a personal computer 40 including a CPU, a RAM, and a hard disc drive.

While not shown in the drawings, the scanning unit 24 includes a reading bar having a plurality of sensors for reading data of an original document placed on a platen, and a drive unit for driving the reading bar. The CPU 21 can control the speed at which the drive unit drives the reading bar. Alternatively, the scanning unit 24 may be configured of a reading bar, and a conveying unit for conveying the original document.

The display unit 25 has a panel for displaying various screen images. In the embodiment, the user operates the operating unit 27 to select items displayed on the display unit 25. However, the display unit 25 may also be configured of a touch screen. In this case, the display unit 25 functions as the operating unit 27. In other words, the user touches areas of the screen displayed on the display unit 25 to select desired items.

A-2. Overview of Data Formats

With the scanner 20 of the embodiment, the user can specify a preferred format for data to be obtained when the CPU 21 controls the scanning unit 24 to scan an original. The data formats are broadly divided into two types: image formats, and document formats. Image formats include JPEG (Joint Photographic Experts Group) and TIFF (Tagged Image File Format). Document formats include PDF (Portable Document Format) and XPS (XML Paper Specification). When executing a scanning operation, the user can operate the operating unit 27 to select one of these four formats as the preferred format for the outputted data.

A-2-1. Image Formats

Figure 2:
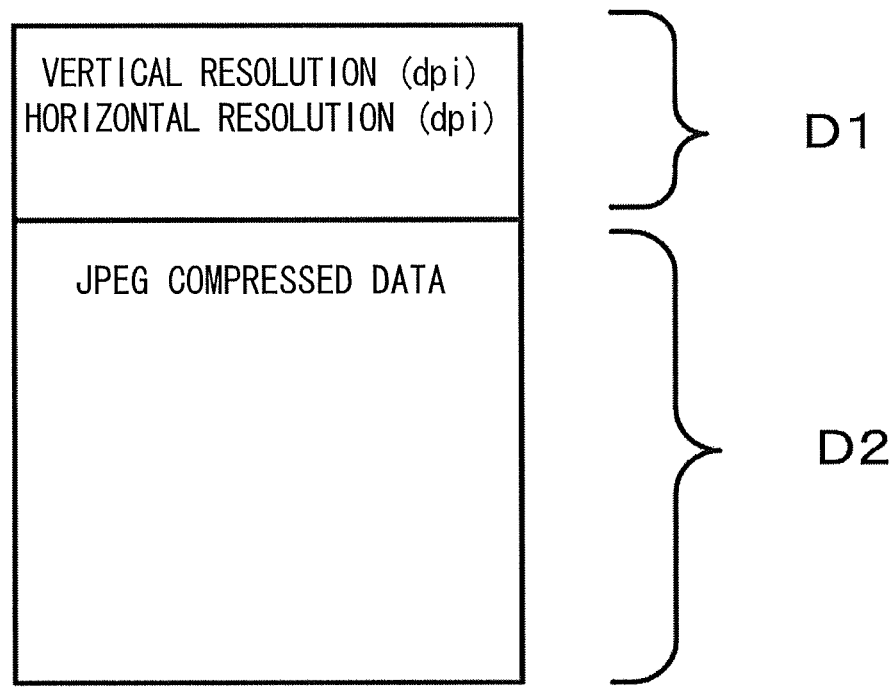
FIG. 2 is an explanation diagram illustrating a data structure of a JPEG format.

FIG. 2 shows the general data structure of the JPEG format. As shown in FIG. 2, a JPEG file includes a header section D1, and a body section D2. The TIFF format has a similar structure.

The header section D1 includes information on the resolution of the image data. Resolution data includes two values: the vertical resolution (dpi) indicating a resolution for a vertical direction and the horizontal resolution (dpi) indicating a resolution for a horizontal direction. The body section D2 includes image data compressed according to the JPEG format. With the JPEG format, image data in the body section D2 is displayed according to the vertical and horizontal resolutions included in the header section D1.

When acquiring JPEG data from the scanner 20, the vertical direction corresponds to the sub-scanning direction in the scanner 20, while the horizontal direction corresponds to the main scanning direction. The CPU 21 controls the scanning unit 24 to scan an original at the resolution specified by the data in the header section D1 and stores image data acquired from the scanning operation in the body section D2.

A-2-2. Document Formats

Figure 3:
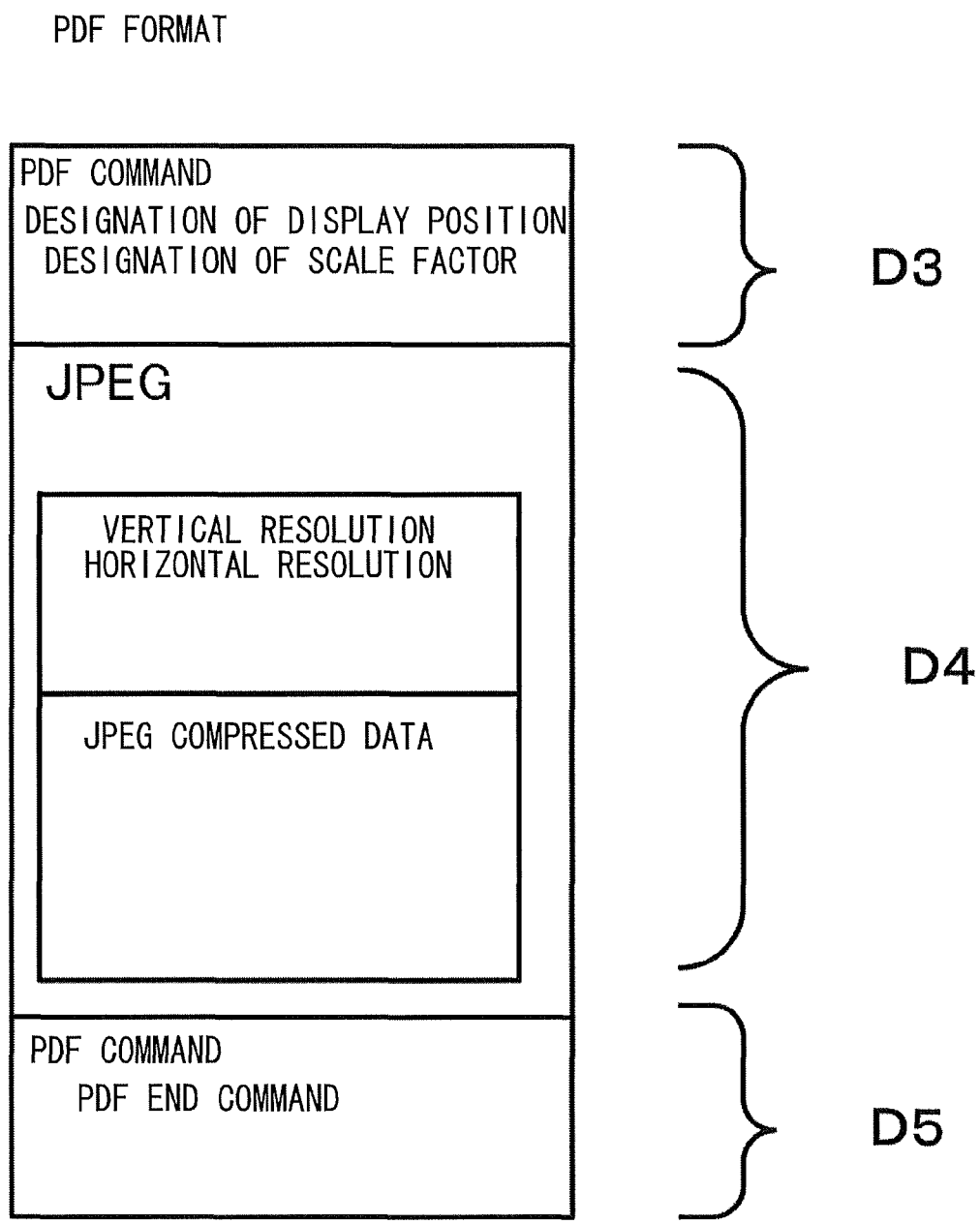
FIG. 3 is an explanation diagram illustrating a data structure of a PDF format.

FIG. 3 shows the general structure of a PDF file. As shown in FIG. 3, the PDF format includes a start command D3, a body section D4, and an end command D5. The XPS format has a similar structure.

The start command D3 stores PDF commands equivalent to the header section D1 of FIG. 2. A PDF command includes data specifying a display position, and data specifying a scale (scaling factor). Data specifying the display position includes data indicating at what positions JPEG image data is laid out in the PDF file. The data specifying a scale includes information indicating scaling factor values (scaling factors) for both vertical and horizontal directions at which to display the PDF file. For example, the scale data may include data specifying a 200% vertical scaling factor and a 100% horizontal scaling factor. The body section D4 includes image data in the JPEG format. Hence, the body section D4 includes resolution data for vertical and horizontal directions, and image data compressed in the JPEG format. Hence, the body section D4 includes resolution data for vertical and horizontal directions, and image data compressed in the JPEG format. The end command D5 stores a PDF command including data representing the end of the JPEG image data. Unlike the JPEG format, the PDF format can configure a plurality of pages.

When PDF data is acquired from the scanner 20, the scale data in the start command D3 includes the value of the resolution setting that the user set through operations on the operating unit 27 before the scanning unit 24 executed the scanning operation. The data specifying the display position is added to the start command D3 after the scanning unit 24 has executed the scanning operation based on the vertical and horizontal dimensions of the JPEG image data obtained in the scan. The PDF command is written in the end command D5 of the PDF data after the scanning unit 24 executes the scan.

A-2-3. Differences between the Image Format and the Document Format

Next, different features of the image formats and document formats will be described. The table in FIG. 4 shows the availability of scaling for the JPEG and TIFF image formats, and for the PDF and XPS formats.

Here, a description will be given for features of a first type of application program used to display data in an image format (e.g., a JPEG image), and a second type of application program used to display data in a document format (e.g., the PDF format).

Common application programs of the first type display images possessing an image format, without modifying the scale (scaling factor) of the image data. Consequently, when the vertical and horizontal resolutions of the image data differ, common application programs of the first type will distort the image.

Special application programs of the first type can properly display such images, even when the vertical and horizontal resolutions of the image data differ. Take as an example the case in which data in the header section D1 of a JPEG file describes the vertical resolution at 300 dpi and the horizontal resolution at 600 dpi. Special application programs of the first type can display the image data by enlarging the compressed JPEG data at 200% vertically and 100% horizontally based on the vertical and horizontal resolutions.

However, the common application programs of the first type simply display the compressed JPEG data without enlarging (or scaling) the data, even when the vertical and horizontal resolutions differ. Therefore, when the scanner 20 according to the embodiment generates data in an image format such as the JPEG and TIFF formats, the CPU 21 sets the resolution for the main scanning direction and the resolution for the sub-scanning direction to the same value when controlling the scanning unit 24 to execute the scan.

In contrast, common application programs of a second type can scale (change the scaling factor) image data when displaying images based on image data having a document format. Accordingly, common application programs of the second type can display images properly, even when compressed JPEG data included in the document format data has differing vertical and horizontal resolutions. Take as an example the case in which a part of the body section D4 (corresponding to the header section D1 of the JPEG file) includes a description for JPEG data in a PDF file indicating a vertical resolution of 300 dpi and a horizontal resolution of 600 dpi. The common application programs of the second type can display this image data after enlarging the compressed JPEG data at 200% vertically and 100% horizontally based on the scale settings in the start command D3.

A-2-4. Correlations between Format and Resolution

The tables in FIG. 5 show correlations between resolution settings set by the user and scanning resolutions of the scanning unit 24. In the embodiment, "scanning resolution" denotes the optical resolution of the scanning unit 24 when executing a scan. The NVRAM 23 stores the correlations between the resolution settings and the scanning resolution shown in the table 5A, 5B, and 5C.

The table 5A in FIG. 5 shows correlations between resolution settings set by the user and the scanning resolution of the scanning unit 24 for outputting data in an image format. In order to support common application programs of the first type described above, the image formats in the embodiment have the same values set for the scanning resolution in the main scanning direction and the scanning resolution in the sub-scanning direction when the scanning unit 24 is instructed to execute a scan. Therefore, the same resolution entered in the user-specified resolution setting column is used as the scanning resolution for the main scanning direction and the scanning resolution for the sub-scanning direction when the actual scan is performed. For example, when the user selects 150 dpi as the resolution setting, the CPU 21 instructs the scanning unit 24 to execute a scan at a resolution of 150 dpi in the main scanning direction and a resolution of 150 dpi in the sub-scanning direction. Similarly, when the user-specified resolution setting is 300, 600, and 1200 dpi, the CPU 21 instructs the scanning unit 24 to execute a scan using the same resolution value for both the main scanning direction and the sub-scanning direction.

The table 5B corresponds to the document format when optical character recognition (hereinafter "OCR") is applied. In the following description, it is assumed that high-quality scan data must be outputted in the document format when the CPU 21 is performing OCR in order that the characters can be recognized accurately. Hence, in the embodiment, correlations between the resolution settings for document formats with OCR and scanning resolutions are identical to the correlations used for image formats described above. In other words, the CPU 21 instructs the scanning unit 24 to perform a scan such that the resolution value of the resolution setting set by the user is equal to each of the resolution values for the main scanning direction and the sub-scanning direction when the actual scan is performed.

The table 5C corresponds to the document format when OCR is not applied. As described above, when displaying image data having a document format, common application programs of the second type for displaying such formats can modify the scale of the image data when displaying the image. Thus, it is permissible for the scanning resolution used by the scanning unit 24 during the actual scan to have different resolution values for the main scanning direction and the sub-scanning direction.

As indicated in the column under "Scanning resolution" in Table 5C for the resolution setting "High-speed 600 dpi," the scanner 20 can scan an original at different resolutions for the main scanning direction and the sub-scanning direction when producing data in a document format without applying OCR. In such cases, the product of the resolution for the main scanning direction and the resolution for the sub-scanning direction for a scan executed by the scanning unit 24 may be equivalent to the square of the user-specified resolution setting. That is, the resolutions for the main and sub-scanning directions satisfy the following equation.

$$L \times M = X^2 \qquad \text{(Equation 1)}$$

Here, L is the scanning resolution in the main scanning direction for a scan performed by the scanning unit 24, M is the scanning resolution in the sub-scanning direction, and X is the resolution setting specified by the user.

For example, $X^2$ equals 360,000 for a user-specified resolution setting of 600 dpi. Therefore, when the scanning resolution L for the main scanning direction is 1200 dpi, the scanning resolution M for the sub-scanning direction is stored as 300 dpi in the NVRAM 23. Using these settings, the CPU 21 can output data at a resolution equivalent to the user's preference.

As described above, even when the value of the user-specified resolution setting for an image format is the same as the value of the user-specified resolution setting for a document format, the scanning unit 24 can execute the scan with different resolutions for the main scanning direction and the sub-scanning direction in a case where the document format is selected.

The CPU 21 in the embodiment can control the scanning unit 24 to scan an original with a resolution of 1200 dpi in the main scanning direction and a resolution of 300 dpi in the sub-scanning direction when the user indicates a desire to perform a high-speed scan in S114 of the flowchart in FIG. 6 described later. However, if the user does not indicate a desire to execute a high-speed scan, the CPU 21 controls the scanning unit 24 to scan the original at a resolution of 600 dpi in both the main scanning direction and the sub-scanning direction.

When performing a high-speed scan in the embodiment, the CPU 21 increases the speed of the reading bar provided in the scanning unit 24. Consequently, it takes less time to perform a high-speed scan than a normal scan.

In the embodiment, the CPU 21 executes a scan with different resolution values for the main scanning direction and the sub-scanning direction only when the resolution selected by the user is 600 dpi, as shown in Table 5C of FIG. 5, but different configurations may be employed. Data for a resolution in the main scanning direction and a different resolution in the sub-scanning direction may be pre-stored in the NVRAM 23 for one or a plurality of resolution settings, including 300, 600, and 1200 dpi, for example.

A-3. Scanning Process

Next, a scanning process according to the embodiment will be described. FIG. 6 is a flowchart showing steps in the scanning process of the embodiment.

The CPU 21 begins the scanning process in FIG. 6 upon receiving a command to perform a scanning operation issued by the user through an operation on the operating unit 27.

In S102 of FIG. 6 the CPU 21 confirms that a command to execute a scan has been issued. At this time, the CPU 21 outputs a selection screen SC7 shown in FIG. 7 to the display unit 25. The CPU 21 generates the selection screen SC7 by reading format data stored in the NVRAM 23.

Figure 7:
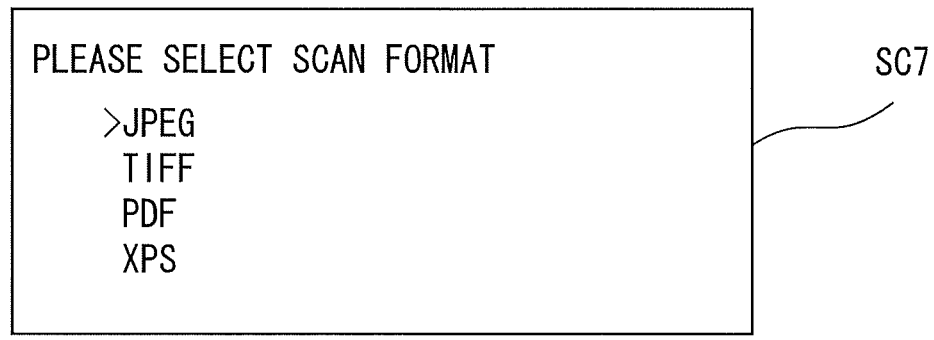
FIG. 7 is an explanation diagram illustrating a screen of a display unit on which the user selects a format of outputted data.

As shown in FIG. 7, the selection screen SC7 includes a list of possible formats for data output. In the embodiment, the selection screen SC7 includes four formats, including the JPEG and TIFF image formats, and the PDF and XPS formats.

Through operations on the operating unit 27, the user specifies one of the data formats in the list as the format for data generated during the scanning operation. After the user performs an operation on the operating unit 27, in S104 the CPU 21 confirms that the user has specified a data format to be obtained as a result of the scanning operation and stores data identifying the specified format in the RAM 22.

Figure 8:
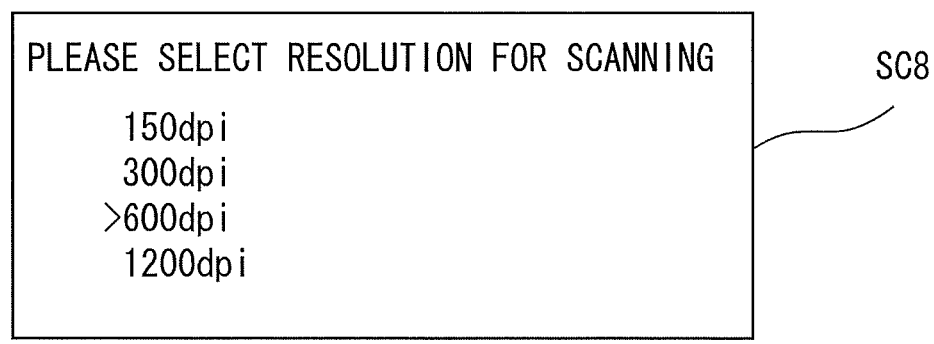
FIG. 8 is an explanation diagram illustrating a screen of the display unit on which the user selects a resolution of the outputted data.

After the user has specified a data format, the CPU 21 next outputs a selection screen SC8 shown in FIG. 8 to the display unit 25. As shown in FIG. 8, the selection screen SC8 includes a list of scanning resolutions. In the embodiment, the selection screen SC8 has a list of four selections for scanning resolution, including 150, 300, 600, and 1200 dpi.

It should be noted here that a plurality of values for resolution settings associated with each data format have been pre-stored in the NVRAM 23. Thus, the CPU 21 reads the plurality of resolution values associated with the data format specified by the user in S104 and generates the selection screen SC8 by creating a list of these resolution values.

The user performs operations on the operating unit 27 to select a desired resolution value from the list as the resolution setting. In S106 the CPU 21 confirms that the user has specified a resolution setting for data acquired in the scanning operation. The CPU 21 stores a value indicating the selected resolution setting in the RAM 22.

After the user has specified a resolution setting in S106, in S108 the CPU 21 determines whether the user-specified format is an image format (JPEG or TIFF) or a document format (PDF or XPS). Specifically, the CPU 21 reads data for the format specified by the user in S104 that has been stored in the RAM 22.

When the specified format is determined in S108 to be the JPEG or TIFF format, in S128 the CPU 21 reads the value of the resolution setting that was set by the user in S106 and stored in the RAM 22.

The CPU 21 sets the scanning resolution to the resolution for the main scanning direction and the resolution for the sub-scanning direction that are associated with the value of the user-specified resolution setting. For example, when the user has selected the resolution setting of 600 dpi from the selection screen SC8, the CPU 21 sets the scanning resolution for both the main scanning direction and the sub-scanning direction to 600 dpi. The NVRAM 23 pre-stores the scanning resolution values in association with the resolution setting.

In S130 the CPU 21 writes the resolution values for the main scanning direction and the sub-scanning direction in the header section D1 of FIG. 2. In S132 the CPU 21 issues a command to the scanning unit 24 to perform a scan based on the scanning resolutions written in the header section D1. In S134 the CPU 21 adds a command indicating the end position of image data at the end of the scan data, and ends the scanning process of FIG. 6.

Figure 9:
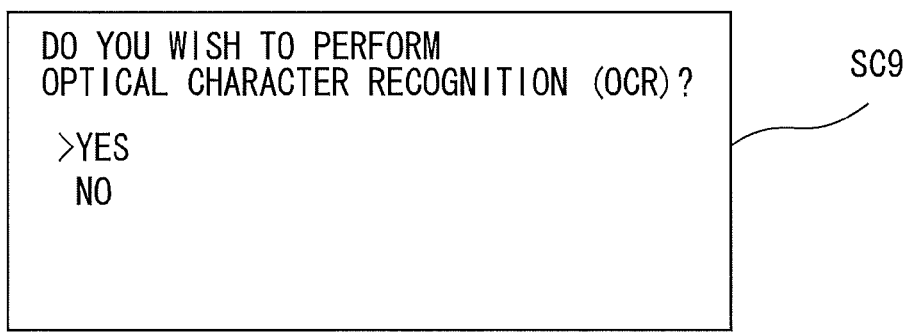
FIG. 9 is an explanation diagram illustrating a screen of the display unit on which the user determines whether an optical character recognition is performed.

However, if the format specified by the user is determined in S108 to be either the PDF or XPS format, then the CPU 21 outputs a selection screen SC9 shown in FIG. 9 to the display unit 25. As shown in FIG. 9, the selection screen SC9 offers the choice to have the CPU 21 perform or not perform OCR when outputting the scan data. The user selects a preference through an operation on the operating unit 27. In S110 the CPU 21 determines whether the user wishes to perform OCR on the scan data.

If the user indicates a desire to perform OCR on the scan data, in S122 the CPU 21 reads the resolution setting set by the user in S106. The CPU 21 sets the scanning resolution to the resolutions for the main scanning direction and the sub-scanning direction that are associated with the resolution setting read in S122. The NVRAM 23 pre-stores the scanning resolutions in association with the resolution setting.

In S124 the CPU 21 writes the resolutions for the main scanning direction and the sub-scanning direction read in S122 to the body section D4 as data for the vertical and horizontal resolutions as the scanning directions. In S126 the CPU 21 also writes as scale data a scaling factor for the vertical direction and the same scaling factor for the horizontal direction in a PDF command of the start command D3 shown in FIG. 3. For example, the CPU 21 may write values indicating 100% as the scaling factor for both vertical and horizontal directions. Subsequently, in S132 the CPU 21 issues a command to the scanning unit 24 to perform a scan based on the scanning resolutions written in the body section D4. In S134 the CPU 21 writes data specifying the display position to the start command D3, adds a command indicating the end position of image data to the end of the scan data, and subsequently ends the scanning process of FIG. 6. Although not described in detail herein, the CPU 21 executes an OCR process following the process in S132 on the compressed JPEG data to be stored in the body section D4.

On the other hand, if the CPU 21 determines in S110 that the user has not requested that OCR be performed, in S112 the CPU 21 determines whether a high-speed scan can be executed at the resolution setting specified by the user in S106. That is, the CPU 21 determines whether the resolution for the sub-scanning direction associated with the user-specified resolution setting is smaller than the resolution for the main scanning direction. This determination is performed based on the scanning resolution values stored in the NVRAM 23 in association with the resolution setting.

If the CPU 21 determines in S112 that a high-speed scan cannot be executed at the resolution setting specified in S106, then the processes in S122, S124, S126, S132, and S134 are executed as described above, except that OCR is not applied in this case.

Figure 10:
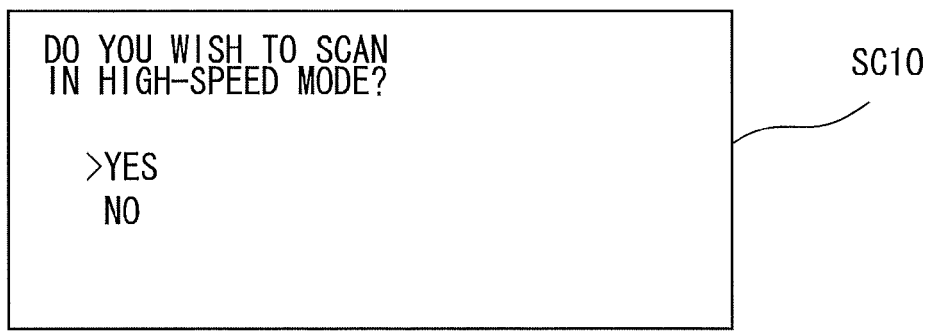
FIG. 10 is an explanation diagram illustrating a screen of the display unit on which the user determines whether a high-speed scan is performed.

If the CPU 21 determines in S112 that a high-speed scan can be executed at the resolution setting specified in S106, the CPU 21 outputs a selection screen SC10 shown in FIG. 10 to the display unit 25. As shown in FIG. 10, the selection screen SC10 includes a choice for controlling the scanning unit 24 to execute a high-speed scan. Through operations on the operating unit 27, the user selects an option for executing or not executing the scan at a high-speed. In S114 the CPU 21 determines whether the user indicated a desire to perform a high-speed scan.

If the user does not wish to perform the scan at a high speed, then the processes in S122, S124, S126, S132, and S134 are executed as described above, except that OCR is not applied in this case.

However, if the user wishes to execute a high-speed scan, in S116 the CPU 21 reads the value of the resolution setting specified by the user in S106 and stores, as the scanning resolutions, the resolution for the main scanning direction and a different resolution for the sub-scanning direction in the RAM 22.

In S118 the CPU 21 writes the resolutions for the main scanning direction and the sub-scanning direction read in S116 in the body section D4 shown in FIG. 3 as data for the vertical and horizontal resolutions, respectively. At the same time, in S120 the CPU 21 writes values indicating scaling factors for the vertical and horizontal directions in a PDF command of the start command D3 in FIG. 3 as data specifying the scale, which values must satisfy the following equation.

$$P:Q=1/M:1/L \qquad \text{(Equation 2)}$$

Here, P represents the vertical scaling factor, Q the horizontal scaling factor, M the resolution in the sub-scanning direction, and L the resolution in the main scanning direction.

When executing a high-speed scan in the embodiment, the CPU 21 sets the resolution L for the main scanning direction to 1200 dpi and the resolution M for the sub-scanning direction to 300 dpi, for example, and controls the scanning unit 24 to execute a scan at these resolutions. Hence, the CPU 21 writes, to the start command D3, a scaling factor P for the main scanning direction indicating 100% and a scaling factor Q for the sub-scanning direction indicating 400%. Here, the values written as P and Q may be relatively prime.

Subsequently, in S132 the CPU 21 commands the scanning unit 24 to execute a scan at the scanning resolution stored in the RAM 22 while speeding up the movement of the reading bar. Finally, in S134 the CPU 21 writes data specifying the display position to the start command D3 and adds a command indicating the end position of the image data to the end of the scan data. Subsequently, the CPU 21 ends the scanning process of FIG. 6.

As shown in FIG. 1, the CPU 21 corresponding to a scan control unit functions as a data format selecting unit performing S102, a character recognition determining unit performing S110, and a speed determining unit performing S114.

As described above, the scanner of the embodiment determines whether the format for outputted scan data is to be the JPEG or the TIFF format, or the PDF or the XPS format. Upon determining that the format is to be either the JPEG or the TIFF format, the scanner executes a scan using the same resolution values for both main scanning and sub-scanning directions. However, when determining that the format is to be the PDF or the XPS format, the scanner can execute the scan using different resolution values for the main scanning and sub-scanning directions. Also, in the case of the PDF or the XPS format, the scanner of the embodiment can execute a scan using different resolutions for the main scanning and sub-scanning directions when the user has selected options in the screens of FIGS. 9 and 10 indicating a desire not to execute OCR but to perform a high-speed scan. Thus, depending on whether the outputted format is to be one of the JPEG and the TIFF formats or one of the PDF and the XPS formats, the scanner of the embodiment can execute the scan at differing resolutions, thereby scanning at the most suitable resolution for the format.

B. Variations

While the invention has been described in detail with reference to the embodiment thereof, it would be apparent to those skilled in the art that various changes and modifications may be made therein without departing from the scope of the invention.

(1) In the embodiment described above, the CPU 21 controls the scanning unit 24 to perform a scan using different values of resolution for the main scanning direction and the sub-scanning direction when determining that the user has selected either the PDF or XPS format in S104, but a variation of this configuration may be used. That is, the CPU 21 may control the scanning unit 24 to perform a scan using the same resolutions for the main scanning direction and the sub-scanning direction, even when the user has selected the PDF format or the XPS format. For example, the CPU 21 may control the scanning unit 24 to perform a scan at 150 dpi as the resolution for the main scanning direction and 150 dpi as the resolution for the sub-scanning direction when generating data in the JPEG or TIFF format, and may control the scanning unit 24 to execute a scan at a resolution of 300 dpi for both the main scanning direction and the sub-scanning direction, even when the generated file is in the PDF or XPS format.

(2) In the embodiment described above, the CPU 21 controls the scanning unit 24 to perform a scan using the same resolution values for the main scanning direction and the sub-scanning direction when the user has selected the JPEG format or the TIFF format in S104, but a variation of this configuration may be used. That is, when the application program for which the scan data is intended to be used can modify the scale of the scan data so as to satisfy Equation 2 described above based on the data for the vertical and horizontal resolutions recorded in the header section D1 shown in FIG. 2, the user may be prompted to select whether or not to scan the original at different resolutions for the main scanning direction and the sub-scanning direction, even when the user has selected the JPEG or TIFF format. For example, the resolution in the main scanning direction may be greater than the resolution in the sub-scanning direction.

(3) In the embodiment described above, the CPU 21 executes a scan at 1200 dpi resolution in the main scanning direction and 300 dpi resolution in the sub-scanning direction when the user selected the scanning resolution 600 dpi in S106, but a variation of this configuration is possible. For example, the CPU 21 may perform a scan at a resolution of 2400 dpi in the main scanning direction, for example, and 150 dpi in the sub-scanning direction, for example, when the sensors provided in the reading bar are capable of performing scans at a higher resolution.

Further, in the embodiment described above, the resolutions for the main scanning direction and the sub-scanning direction are configured to satisfy Equation 1 when the user selected the PDF or XPS format in S104, but the different configuration can be possible. For example, the scanning resolution for the sub-scanning direction may be set to a smaller value than the value calculated in Equation 1 when the user wishes to perform the scan at a higher speed. Further, the resolution for the main scanning direction may be set to a value larger than that calculated in Equation 1 when the user wishes to perform the scan at a higher quality.

(4) In the embodiment described above, the CPU 21 executes a scan using the same resolution values for both the main and sub-scanning directions when the user selected either the PDF format or the XPS format in S104 and when the user wishes to apply OCR. However, the CPU 21 may execute the scan at different resolution values in this case. For example, the CPU 21 may set a smaller resolution for the sub-scanning direction than the main scanning direction, even when the user wishes to apply OCR. With this configuration, the CPU 21 can perform a high-speed scan, even when outputting data in the PDF or XPS format that is subjected to OCR.

(5) In the embodiment described above, the CPU 21 performs a scan using different values of resolution for the main scanning direction and the sub-scanning direction only when the user has expressed a desire to execute the scan at a high speed, even if the user has selected the PDF or XPS format in S104, but a variation of this configuration is possible. That is, the scanning unit 24 may be configured to scan at different resolution values for the main scanning and sub-scanning directions when the user has selected the PDF or XPS format, without prompting the user to select whether or not to perform the scan at a high speed. This configuration eliminates the user's time and effort for selecting an option to execute the scan at high speed.

Further, the scanner 20 according to the embodiment executes a high-speed scan when the PDF or XPS format has been selected and when the resolution of the sub-scanning direction corresponding to the resolution setting for outputting data in the PDF or XPS format is set smaller than the resolution of the sub-scanning direction corresponding to the same resolution setting for outputting data in the JPEG or TIFF format. However, the scanner 20 may be configured to scan originals for the PDF or XPS format at the same speed used when scanning data to be outputted in the JPEG format.

(6) As described above, the scanner 20 is configured to prompt the user to specify a data format in S104 and subsequently to specify a resolution setting in S106, but a variation of this configuration is possible. That is, a first scanning resolution and a second scanning resolution different from the first scanning resolution may be stored in the NVRAM 23 in advance in association with image formats and document formats, respectively. For example, the scanner 20 may perform a scan at the first scanning resolution, for example, a resolution of 600 dpi for the main scanning direction and the sub-scanning direction when the user selects an image format whereas the scanner 20 may perform a scan at the second scanning resolution, for example, a resolution of 1200 dpi for the main scanning direction and 300 dpi for the sub-scanning direction when the user selects a document format. This configuration eliminates the user's time and effort for specifying resolution settings.

(7) While the user is prompted to select a format in S104 of the embodiment, the scanner 20 may have a different configuration. For example, the scanner 20 may select a data format having a scanning resolution suited to the destination to which the scan data is transferred. Specifically, the CPU 21 may select different formats for cases in which the scan data is transferred to another device via the network and cases in which the scan data is transferred to portable memory. This configuration removes the need for the user to select a format.

(8) In the embodiment described above, the user issues a command to perform a scan through operations on the operating unit 27 of the scanner 20. However, the user may issue a scan command through operations on an operating unit of a terminal device (for example, the personal computer 40) connected to the scanner 20 via a LAN, for example. Hence, the user is not limited to performing "push scans," as described in the embodiment, but may also perform "pull scans."

(9) In the embodiment described above, scan data is converted to a file of the specified format within the scanner itself, but the scan data may be converted to files of the specified format within a terminal device (for example, the personal computer 40) connected to the scanner 20 via a LAN. In other words, the CPU 21 performs a control process to transmit scan data acquired with the scanner 20 to the terminal device, and the terminal device generates a file in the specified format (JPEG, TIFF, PDF, or XPS).

(10) In the embodiment, the CPU 21 of the scanner 20 controls the scanning unit 24. However, a terminal device (for example, the personal computer 40) connected to the scanner 20 via a LAN may be configured to control the scanning unit 24 instead.

(11) At least part of processes shown in FIG. 6 may be performed a specific hardware, such as ASIC.

What is claimed is:

1. A control device comprising:
a processor functioning as:
   a scan control unit controlling a scanning operation in which data is to be generated by reading a document;
   a data format selecting unit selecting one of a first format or a second format different from the first format as a data format in which the data is to be generated;
   a resolution setting unit setting a reading resolution based on the data format; and
   a character recognition determining unit determining whether character recognition is instructed when the data format selecting unit selects the second format,
wherein the resolution setting unit sets a first resolution as the reading resolution when the data format selecting unit selects the first format or when the data format selecting unit selects the second format and when the character recognition is instructed,
wherein the resolution setting unit sets a second resolution different from the first resolution as the reading resolution when the data format selecting unit selects the second format and when the character recognition is not instructed; and
wherein the scan control unit controls the scanning operation to read the document in the reading resolution set by the resolution setting unit.

2. The control device according to claim 1, wherein the second resolution includes a first value and a second value different from the first value, the first value indicating a resolution in a main scanning direction, the second value indicating a resolution in a sub scanning direction different from the main scanning direction.

3. The control device according to claim 1, wherein the first resolution includes a first value and a second value equal to the first value, the first value indicating a resolution in a main scanning direction, the second value indicating a resolution in a sub scanning direction different from the main scanning direction.

4. The control device according to claim 1, wherein the first resolution includes a first value indicating a resolution in a sub scanning direction; and
   wherein the second resolution includes a second value indicating a resolution in the sub scanning direction, the second value being smaller than the first value.

5. The control device according to claim 1, wherein the first resolution includes a first value indicating a resolution in a main scanning direction; and
   wherein the second resolution includes a second value indicating a resolution in the main scanning direction, the second value being greater than the first value.

6. The control device according to claim 1,
   wherein the first resolution includes a first value and a second value, the first value indicating a resolution in a main scanning direction, the second value indicating a resolution in a sub scanning direction different from the main scanning direction,
   wherein the second resolution includes a third value and a fourth value, the third value indicating a resolution in the main scanning direction, the fourth value indicating a resolution in the sub scanning direction,
   wherein a product of the first value and the second value is equal to a product of the third value and the fourth value.

7. An control device, comprising:
a processor functioning as:
   a scan control unit controlling a scanning operation in which data is to be generated by reading a document;

a data format selecting unit selecting one of a first format or a second format different from the first format as a data format in which the data is to be generated;

a resolution setting unit setting a reading resolution based on the data format; and a speed determining unit determining, when the data format selecting unit selects the second format, which speed mode is selected from a first speed mode and a second speed mode in which the image is read faster than the first mode, wherein the resolution setting unit sets a first resolution as the reading resolution when the data format selecting unit selects the first format whereas the resolution setting unit sets a second resolution different from the first resolution as the reading resolution when the data format selecting unit selects the second format, wherein the scan control unit controls the scanning operation to read the document in the reading resolution set by the resolution setting unit, wherein the scanning operation is performed either in the first speed mode or the second speed mode, wherein the resolution setting unit sets the first resolution when the data format selecting unit selects the second format and when the speed determining unit determines the first speed mode whereas the resolution setting unit sets the second resolution when the data format selecting unit selects the second format and when the speed determining unit determines the second speed mode.

8. The control device according to claim 1, wherein the first format includes an image format.

9. The control device according to claim 1, wherein the second format includes a document format.

10. A non-transitory computer readable storage medium storing a set of program instructions for controlling a computer, the program instructions comprising:

(a) controlling a scanning operation in which data is to be generated by reading a document;

(b) selecting one of a first format or a second format different from the first format as a data format in which the data is to be generated;

(c) setting a reading resolution based on the data format; and (d) determining whether character recognition is instructed when the selecting instruction (b) selects the second format, wherein the setting instruction (c) sets a first resolution as the reading resolution when the selecting instruction (b) selects the first format or when the selecting instruction (b) selects the second format and when the character recognition is instructed, wherein the setting instruction (c) sets a second resolution different from the first resolution as the reading resolution when the selecting instruction (b) selects the second format and when the character recognition is not instructed; and wherein the controlling instruction (a) controls the scanning operation to read the document in the reading resolution set by the setting instruction (c).

* * * * *